Dec. 18, 1956  S. J. OGRABISZ  2,774,101
EVISCERATING APPARATUS FOR POULTRY
Filed Oct. 4, 1954  3 Sheets-Sheet 2
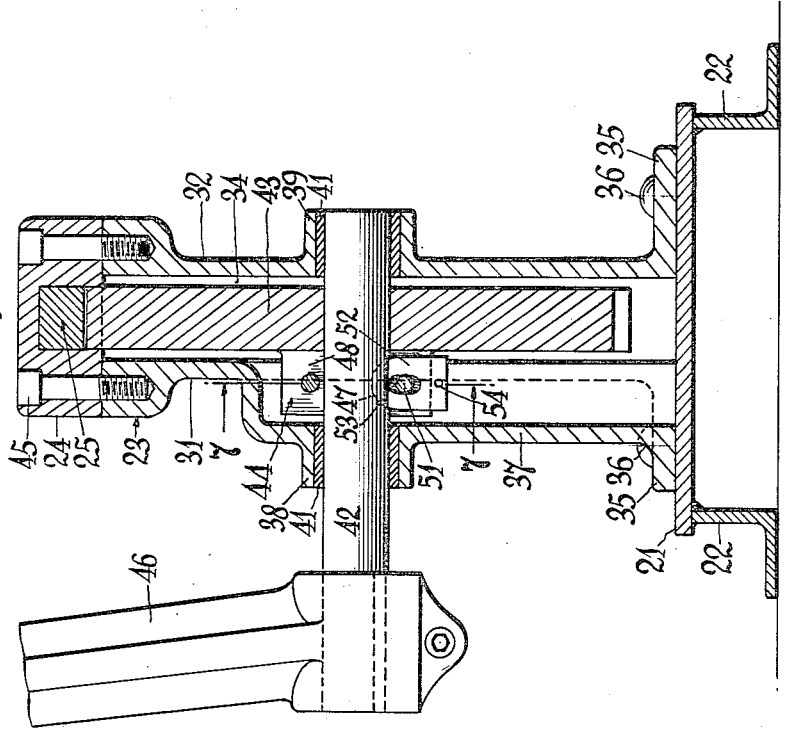
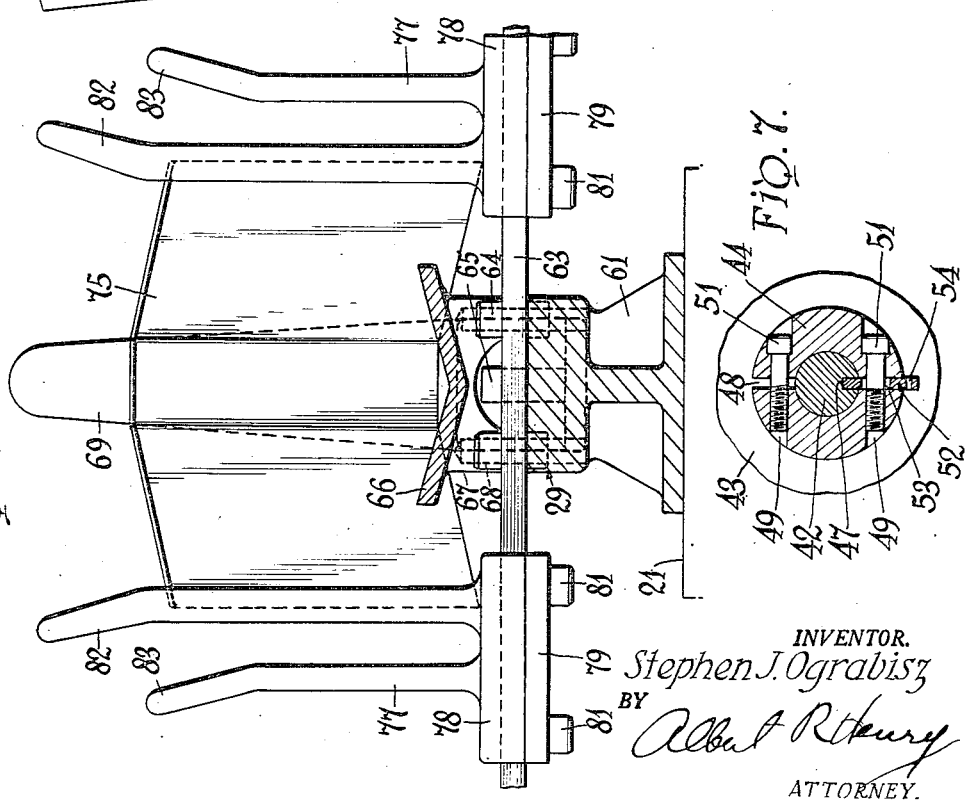
INVENTOR.
Stephen J. Ograbisz
BY
Albert R Henry
ATTORNEY.

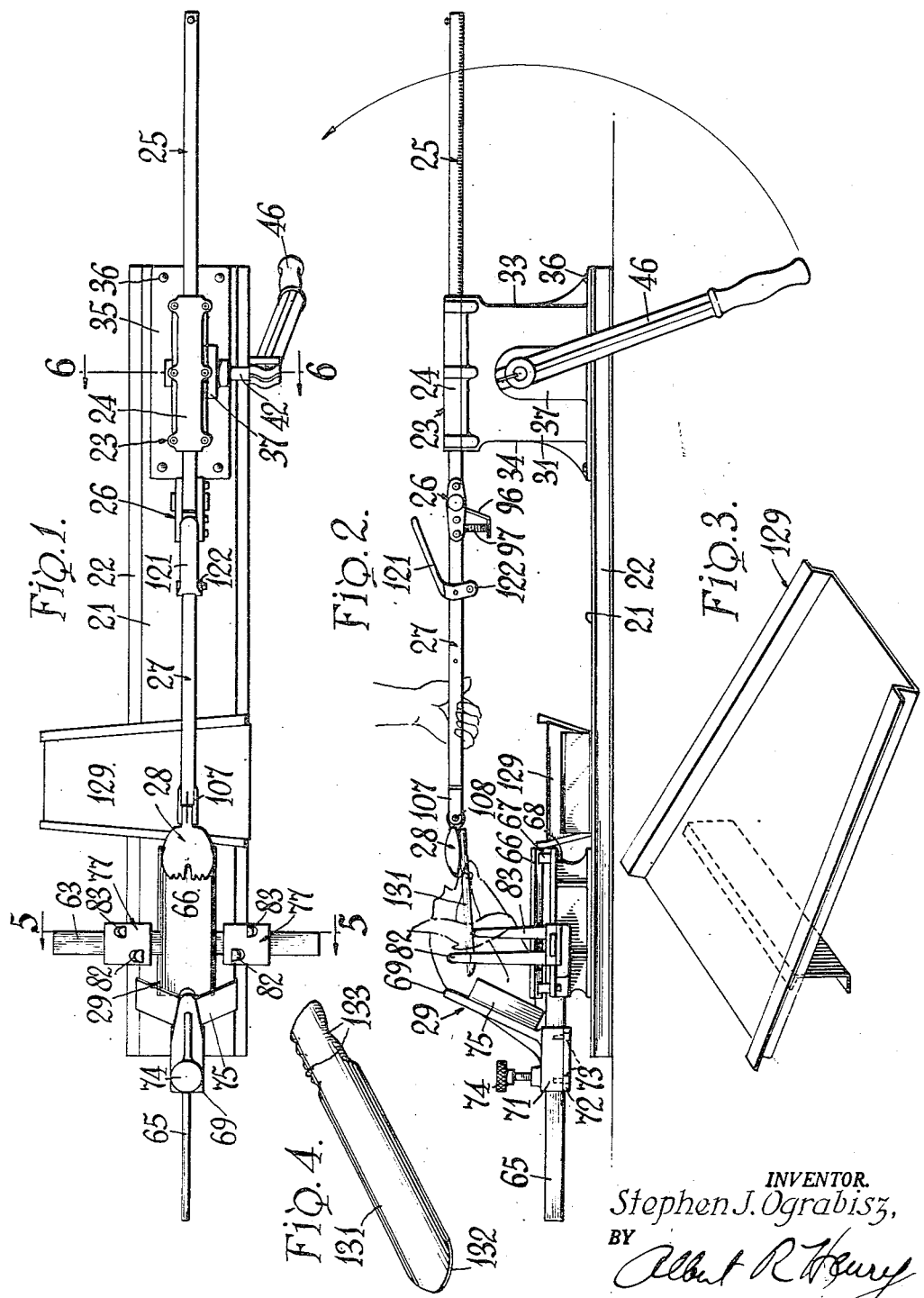

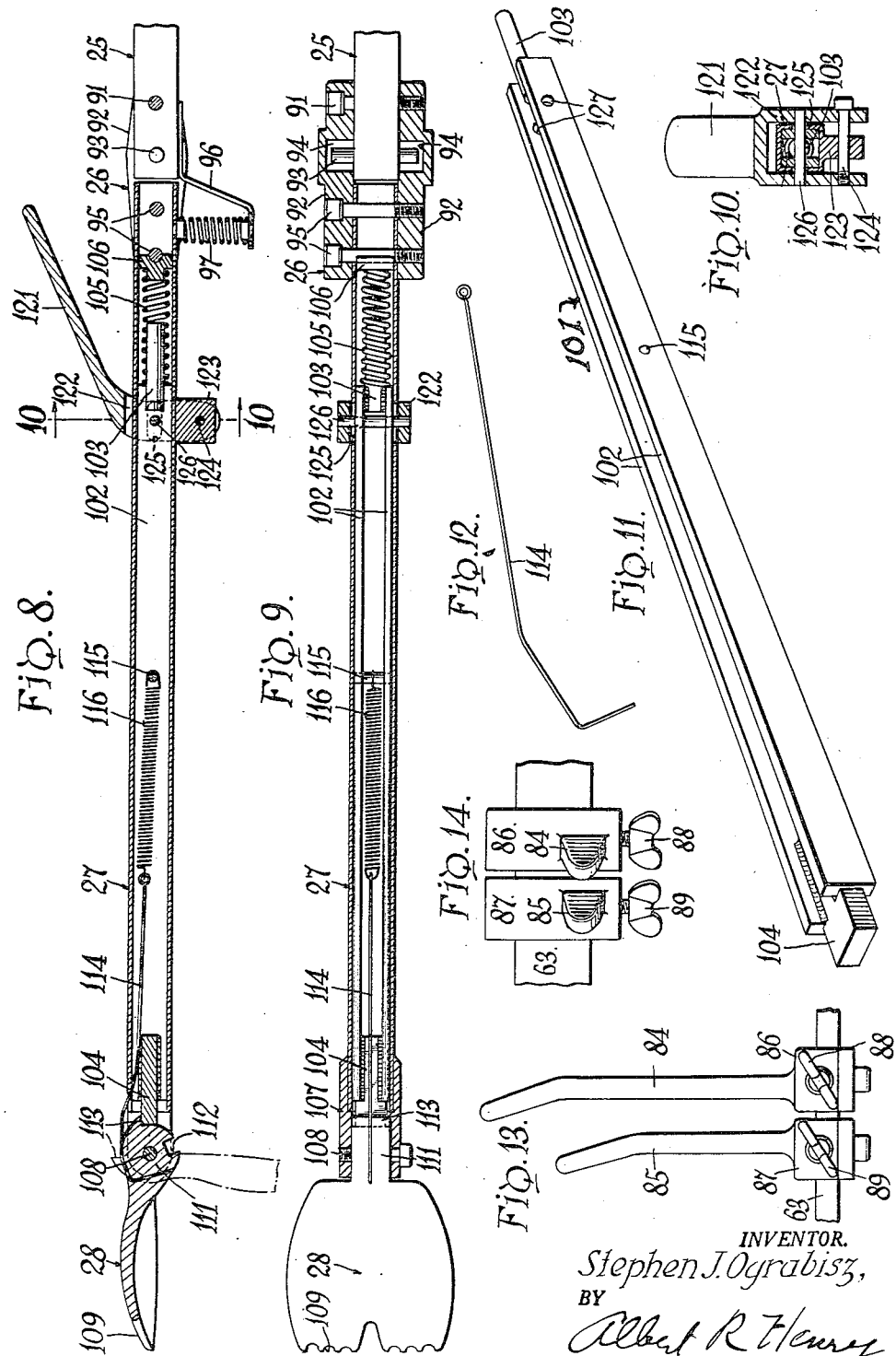

United States Patent Office 2,774,101
Patented Dec. 18, 1956

2,774,101

EVISCERATING APPARATUS FOR POULTRY

Stephen J. Ograbisz, Hamburg, N. Y.

Application October 4, 1954, Serial No. 460,213

5 Claims. (Cl. 17—11)

This invention relates to means for cleaning poultry, such as chickens, turkeys, and the like, and it has particular reference to an instrument for removing the organs from inside the carcass of a fowl in an expeditious manner.

In the dressing of poultry for eventual retail sale, it is now generally recognized that it is desirable, from several aspects, to prepare the bird so that it is substantially ready to be cooked, with a minimum of effort on the part of the housewife who is the typical purchaser. This practice, of course, differs from that of not too many years ago, when the purchaser usually had to remove the head and feet and the internal organs, and, in some cases, the feathers as well. While the occasional cleaning of a single bird does not present too arduous a task, a different situation confronts the growers of large flocks of poultry, who habitually kill and dress many birds at one time.

The present description will only allude in passing to the fact that I have heretofore patented devices for removing the head, neck, feet, and tendons of fowl, which operations are best performed after the bird has been picked. There then remains the work of removing the insides from the carcass, and separating the edible from the waste portions. In the past, this labor has been mostly performed by hand, and when laborers are confronted with several hundred birds which must be cleaned quickly, the above noted occasional task becomes an onerous chore, so much so that it is frequently difficult to find people who will accept, or continue long at, employment for this purpose. The fingers which are inserted in the carcass to remove the viscera become raw and lame, and there is too often a rupturing of organs which spill bad taste imparting body fluids on the flesh. Under the laws and regulations of some states, governing the sanitary and other conditions for commercial poultry raising, the carcass, after picking, should be maintained at substantially freezing temperature until the viscera are removed. This low temperature greatly adds to the discomfort of the worker.

A need has therefore existed for an inexpensive and reliable instrument or tool to replace manual evisceration. I am aware that such devices have been proposed, and a number of years ago I, with other growers, tested and experimented with a machine offered for this purpose, but with such disappointing results that we abandoned such device and continued with the hand cleaning method. I have now devised an instrument which I find, from actual use, to be entirely satisfactory, and this specification will set forth the best embodiment thereof now known to me. By means of my invention, a worker can remove all the organs, including the lights, without physical discomfort, and at a much faster rate compared to hand cleaning, without undue fatigue. The entire contents are removed in one operation, and no problem is presented by unwanted rupturing.

Briefly explained, there is provided, among other things, a pivotally mounted projectible and retractable arm, which is moved through an incision in the abdominal wall of the carcass inwardly toward the neck. What I shall term a spoon or claw, for want of a better term, is connected to the advancing end of this arm and, as it contacts the breast bone and flesh, this claw automatically follows the contour of the carcass until, as the neck portion of the breast is reached, the claw is bent downwardly to grip the lights. Provision is made for locking the claw in this engaging position. When the arm is retracted, the claw simply pulls loose all of the contents and carries them out of the carcass, through the abdominal incision, as one mass. The claw may then be restored to its initial position for evisceration of another bird.

In describing the invention in detail, reference will be made to the accompanying drawings, wherein:

Fig. 1 is a plan of the complete machine;

Fig. 2 is a side elevation thereof, with a fowl indicated as mounted on a supporting stage;

Fig. 3 is an enlarged perspective of a pan upon which the removed insides are deposited;

Fig. 4 is a perspective of a spatula which may be used advantageously in connection with the operation;

Figs. 5 and 6 are enlarged sections taken on the correspondingly numbered lines of Fig. 1;

Fig. 7 is a section on the line 7—7 of Fig. 6, showing a shaft key and retaining means therefor;

Figs. 8 and 9 are respectively side and top longitudinal sections through the arm and claw assembly, drawn on an enlarged scale with respect to Figs. 1 and 2;

Fig. 10 is an enlarged section on the line 10—10 of Fig. 8;

Fig. 11 is an enlarged perspective of a slide carried within the arm;

Fig. 12 is an enlarged perspective of a spring wire interconnecting the slide and claw;

Fig. 13 is a fragmentary side elevation showing an alternative form of wing engaging bracket; and Fig. 14 is a fragmentary plan of the bracket shown in Fig. 13.

Referring initially to Figs. 1 and 2, the machine comprises a relatively narrow elongated base plate 21 connected to angular feet 22, and which is adapted to be positioned on a table or other suitable support. A gear housing 23 is bolted to the plate 21 at one end thereof, and its upper surface has secured thereto a guide box 24, in which is reciprocably mounted a rack bar 25. A knuckle 26 is pivotally mounted on one end of the rack bar 25, and to the knuckle is connected an arm 27, having a claw 28 pivotally connected to its opposite end. The other end of the plate 21 has mounted thereon a supporting stage 29, on which may be positioned the fowl to be eviscerated. As the rack bar and arm and claw are advanced toward the bird, the claw enters the abdominal cavity, follows the contour of the breast, by reason of its pivotal connection to the arm, and so embraces the organs. Reverse movement of the arm enables the claw to withdraw the viscera.

Considering the various parts in greater detail, and referring additionally to Figs. 6 and 7 for a description of the gear housing 23, it should be noted that this part is advantageously made as a one piece metal casting, having side walls 31 and 32 interconnected by end walls 33 and 34, and having an open top and bottom. Both side walls are provided with angularly disposed flanges 35 at their lower edges, to provide suitable bearing area and to receive bolts or screws 36 to secure the housing to the base plate 21. The side wall 31 is provided with an offset portion 37, having a bearing boss 38 thereon which is aligned with a boss 39 on the side wall 32.

The bosses 38 and 39 are drilled and machined and fitted with bearing bushings 41, in which is rotatably mounted a shaft 42. A spur gear 43, having a hub 44, is mounted on the shaft 42 between the side walls, with the hub 44 extending into the offset portion 37. The gear meshes with the rack bar 25, which, as previously noted, is retained by the U-shaped guide box 24, connected to the top of the gear housing 23 by screws 45. An operating lever 46 is secured to one end of the shaft 42, for rotation of the gear 43 and linear movement of the rack bar 25.

The provision of a one piece housing 23 is desirable from the viewpoint of facilitating the alignment of the bearings 41 and other finishing and assembling operations, but it poses a problem in connecting the gear 43 to the shaft 42. In order to provide a strong key connection between the gear and shaft, which is accessible in an integral housing, the shaft 42 is milled to form a conventional axial keyway 47. The gear hub 44 is milled along a diameter to form a slot 48, and it is further drilled through and tapped along parallel lines at right angles to the slot 48, to provide holes 49 adapted to receive screws 51.

A key 52 is formed with a slot 53 between its ends, and with a hole 54 adjacent one end. This key is of such length that when one end is seated in the keyway 47, the hole 54 projects beyond the periphery of the gear hub 44, as is clearly shown in Figs. 6 and 7. In order to make the assembly, the gear 43 is inserted through an open end of the housing 23, and the shaft 42 is next inserted through the bearing apertures and through the hub of the gear. The parts are then rotated with respect to each other until the slot 48 is both aligned with the keyway 47 and is visible from the bottom of the offset portion 37 of the housing 23.

The key 52 is then inserted into the slot and keyway, a pair of pliers or other gripping tool being employed to force the key home. The assembly is then rotated to expose the holes 49, so that the screws 51 may be inserted and tightened. By forming the slot 53 in the key 52, there is adequate clearance to insert the screw 51 which passes therethrough. When the screws are tightened, the key is firmly secured against slippage. Should it become desirable to disassemble the gear and shaft, the key may be fished out by inserting a hooked wire into the hole 54.

The supporting stage 29 comprises a pedestal casting 61, bolted to the plate 21, and which is formed with transverse and longitudinal slots respectively for the reception of a cross arm 63, retained by screws 64, and a rearwardly extending bar 65 which may be secured by a set screw or the like, not shown. A horizontally disposed and slightly V-shaped bed 66, formed with depending feet 67, is mounted on the pedestal 61, and above the arm 63, by screws 68. A forwardly inclined bumper 69, formed with a channeled base 71, is slidably positioned on the bar 65, and is retained thereon by a plate 72, secured by screws 73, as is shown in Fig. 2. The bumper 69 may be adjustably secured along the bar 65, and with respect to the adjacent end of the bed 66, by a thumbscrew 74. The bumper 69 is adapted to removably receive a relatively wide breastplate 75, which is bent to conform more or less to the contour of the fowl.

The cross arm 63, which extends to each side of the pedestal 61, provides a mounting for a pair of wing engaging brackets 77. Each bracket comprises a channeled base 78 slidably positioned on the arm 63, and retained from vertical movement by a plate 79 and screws 81. A pair of spaced uprights 82 and 83 extend upwardly from the base 78, and between them will be positioned a wing of the fowl to retain the bird on the bed 66 when the insides are withdrawn. As shown in Figs. 1, 2, and 5, these uprights are offset or staggered with respect to each other. An alternative form of wing bracket is shown in Figs. 13 and 14. In these views, each upright 84, 85, is mounted on its own slidable base 86, 87, and the uprights 84 and 85 are in transverse alignment. Thumbscrews 88 and 89 secure the uprights 84 and 85 in desired spaced relation.

This last type of wing bracket is useful to the poultryman who raises birds of different varieties and sizes, as it enables him to adjust and adapt the supporting stage to the optimum retention of the species being cleaned. The type shown in Fig. 5 is satisfactory when the birds are more uniform, and it has some advantages for such birds as turkeys. It is believed that the use of the supporting stage 29 is now understood. The bird is laid on its back on the bed 66, with the breast bone portion against the bumper 69, and the wings caught between the uprights 82, 83 or 84, 85 as the case may be. The abdominal portion of the carcass is then presented toward the gear housing 23 and, upon rotation of the lever 46, the arm 27 and spoon 28 are advanced toward the carcass, being guided, if required, by the hand, as indicated in Fig. 2.

Referring now primarily to Figs. 8 to 12, the forward end of the rack bar 25 is drilled to receive a pivot screw 91 for pivotally mounting thereon the two like side plates 92 of the knuckle 26. A stop pin 93 is also positioned in the end of the bar 25, and its ends project into sockets 94 formed in the side plates 92, thereby to limit the pivotal movement of the knuckle 26. The arm 27, which is a square tube, is rigidly connected at its end to the knuckle 26 by a pair of screws 95.

A bent support 96 is secured at one end to the underside of the rack bar 25, to extend under the secured end of the arm 27 and there to receive a spring 97 which presses against the arm 27, to serve as a counterbalance for the weight of the arm and spoon assembly. Normally, the arm therefore extends more or less horizontally, but it may be readily moved up or down, within the limits determined by the pin 93 and sockets 94.

The tube of the arm 27 encases a slide 101, formed by two spaced bars 102 interconnected at one end by a post 103 welded thereto, and at the opposite end by a latch 104. A coiled spring 105 is positioned on the post 103 and it also bears against a spring retainer 106 abutting the adjacent screw 95. The slide is therefore constantly urged toward the left hand end of the arm 27, as viewed in Figs. 8 and 9. The outer end of the arm 27 is provided with a bifurcated yoke 107, to which is pivotally mounted the claw 28 by means of a pivot screw 108. The claw comprises a somewhat spoon shaped body having a serrated edge 109 and a generally cylindrical boss 111 which is drilled to receive the screw 108, and which is also formed with a notch 112. The boss 111 also is formed with a detent 113, constituting one limit stop for the latch 104, and it is drilled to receive one end of a wire 114, which passes over the top of the boss and into the arm 27.

The slide 101 is provided with a transverse pin 115, to which is connected one end of a tension spring 116, while the other end is connected to the wire 114. It will accordingly be seen that the claw 28 will be retained in either the outstretched position shown in full lines, with the latch 104 abutting the detent 113, or in the dotted line position of Fig. 8, when the latch 104 seats in the notch 112. The spring 105 urges the latch into engagement with the claw at all times, while the spring 116 and wire 114 act to bias the claw 28 to the outstretched position.

Mechanism for releasing the latch 104 from the notch 112 is provided by a lever 121 having a bifurcated end 122 which is positioned over the arm 27. A lug 123, secured to the under side of the arm, is drilled to provide a bearing for a pivot pin 124, by means of which the lever 121 is mounted on the arm. The arm 27 is provided, adjacent the lever 121, with slots 125 in the side walls thereof, through which is inserted a pin 126 that also passes through holes 127 in the side rails 102 of the slide 101, and thence into the end 122 of the lever 121. When the lever is depressed, the pin 126 is drawn to the right, as viewed in Figs. 8 and 9, to shift the slide 101 bodily within the arm 27, and thus withdraw the latch 104 from the notch 112. The spring 116 then comes into play to restore the claw 28 to its extended position.

An adjunct to the machine, as thus described, comprises a removable tray or chute 129, shown in Figs. 1, 2, and 3, which is placed on the plate 11 in front of the stage 29. The withdrawn viscera simply drop into the tray from which they may slide into a suitable receiver to be available for further processing. Another useful adjunct comprises a spatula 131, Fig. 4, which is formed from a sheet of metal into slightly curved section, and is provided with a rather dull curved front end 132 and finger grips 133 at the opposite end. This spatula is advantageously employed to break loose the tissue between the intestines and the abdominal wall, and it also serves as a protective guide for the claw 28 at the beginning of the operation.

In order to remove the insides from a carcass, the bird is laid on its back on the stage 29, with the wings engaged in the brackets thereof and the breast abutting the bumper 69. It is, of course, presupposed that, as a matter of orderly procedure, the head, crop, and feet have already been removed. An incision is made in the abdominal wall extending from the vent, and of such length as the experience of the operator dictates. The spatula 131 is then inserted in the opening, to loosen the viscera from the frame of the carcass and depress the intestines to a certain extent. As a matter of precaution, the spatula is left in the bird for a moment.

The lever 46 is then rotated to advance the claw 28 into the carcass, and above the convex side of the spatula 131, which thus protects the intestines and other organs from the possibility of a puncture by the serrated edge 109—an event which may occur when the operator is inexperienced or tired or in a hurry. As the claw advances into the carcass, it follows the contour of the abdomen and breast, being urged to do so as the spring 116 yieldingly biases the claw to its extended position, while the body contour bends the claw downwardly about its pivot 108. This balance of forces, together with the movement of the arm in a vertical plane about its pivot 91 and the pivotal movement of the claw 28, tends to prevent an undesired puncturing or tearing of any of the organs, and the claw 28 is moreover constrained to follow closely the curved and irregular contour of the fowl. I consider this feature to be a significant part of the invention, certainly when compared with other machines which have come to my attention, and wherein evisceration has been attempted by plungers or the like, moving in a straight line. Such linear movement ignores the anatomy of the carcass.

By the time the claw 28 has reached the region of the lungs, it has been tipped down so that the edge 109 may grip therein, and also grip the windpipe if it has not already been completely removed. The claw, in turning, ejects the spatula 131, if the operator has not already withdrawn it. The rotation of the lever 46 is now reversed, and the claw 28, now locked by the latch 104, applies pressure to the viscera to eject them from the carcass. On this reverse stroke, the above noted pivotal freedom of movement of the arm 27 again comes into play, as it enables the tip of the claw to follow the curved and irregular backbone region, and thus engage not only the lungs but the kidneys, which are embedded in depressed areas on either side of the backbone.

The machine, constructed substantially to the sizes and proportions illustrated, has a wide adaptability to various fowl. It can be used effectively on broiler chickens weighing about two pounds, on up to the largest tom turkeys which may weigh over thirty pounds. As between these two extremes, of course, some adjustments are to be made, particularly in the selection of a claw of a size suited to the bird. It will be noted that the claw 28 is readily detachable, by simply removing the screw 108, so that a claw of proper size may be readily inserted. The machine has also been found to be positive in action and to be operable at a high rate of speed. As examples, it has been used to clean lots of several hundred birds on a production basis, with less than three percent showing any fragments of viscera remaining in the carcass, and of these, most of such remnants required only a flushing with water to dislodge them. As a demonstration before a group of observers, I was able to clean carcasses at a rate of two a minute. This, of course, would not be expected of a worker, but a rate of seventy an hour is to be expected, without undue fatigue. This is several fold more than can be accomplished by hand cleaning.

It will accordingly be seen that there has been devised a novel and highly effective eviscerating machine which is simple in construction, readily maintained in a sanitary condition, and wherein the principle of operation is consistent with the anatomy of fowl and the results sought to be accomplished. While the invention has been described with respect to one embodiment, it will be apparent that numerous modifications and variations may be effected therein, without departure from the scope of the invention, as expressed in the following claims.

I claim:

1. An eviscerating machine comprising a stage for supporting a carcass, an arm, mechanism for moving the arm linearly toward and away from the stage, a pivotal connection between the arm and mechanism for arcuate movement of the arm in a vertical plane, a claw pivotally mounted on the end of the arm adjacent the stage for arcuate movement in a vertical plane and downwardly toward said stage, yieldable means interconnecting the arm and claw and normally holding the claw in an outstretched position with respect to the arm, said claw being movable downwardly by extraneous pressure applied to the surface thereof, and a latching device between the arm and claw for holding the claw in an angular position with respect to the arm when the claw has been rotated through a predetermined arc.

2. An eviscerating machine comprising a stage for supporting a carcass, an arm mounted for movement both linearly and arcuately with respect to the stage, said arm having an end adjacent the stage, a claw pivotally mounted on said end for limited arcuate movement between one position in which the claw is outstretched with respect to the arm and another position in which said claw is turned angularly with respect to the arm, a slide carried by the arm, a first spring means urging the slide toward the claw, a latch member on the end of the slide engaging the claw, said claw being formed with limit stops engageable by the latch to determine the arc through which the claw may rotate, a second spring member interconnecting the slide and claw, said second spring member yieldably biasing the claw to its outstretched position, the limit stop of the claw engaged by the latch when the claw is in its said angular position interlocking with the latch to retain the claw in said angular position, and means for withdrawing the slide and latch against the urge of said first spring means to enable the second spring member to restore the claw to its outstretched position.

3. An eviscerating machine comprising a stage for supporting a carcass, a hollow arm, mechanism for moving the arm linearly toward and away from the stage, a pivotal connection between the arm and mechanism for arcuate movement of the arm, said arm having one end adjacent the stage and another end adjacent said mechanism, claw pivotally mounted on the stage end of the arm, a movable latch carried within the arm at the stage end thereof, a spring extending from within the arm to the claw and interconnecting therewith, said spring yieldably biasing the claw to one rotative position in which the claw is substantially in line with the arm, a first limit stop on the claw engageable by the latch when the claw is in said one position, a second limit stop on the claw engaging and interlocking with the latch when the claw is in another rotative position, and means for releasing the latch from said second limit stop to enable said spring to restore the claw to said one rotative position.

4. An eviscerating machine comprising a stage for supporting a carcass, an arm, mechanism for moving the arm linearly toward and away from the stage, a pivotal connection between the arm and mechanism for arcuate movement of the arm, means interposed between the arm and mechanism for normally holding the arm in a generally horizontal position with one end thereof adjacent the stage, a claw pivotally mounted on said one end of the arm and adapted, as said arm is moved toward the stage, to enter a carcass thereon, said claw being formed with first and second limit stops, a slidable latch member including a latching element carried by the arm and means urging the latching element into engagement with the claw and the limit stops thereon, said first limit stop being so positioned that when it is engaged by the latching element the claw is in an outstretched position with respect to the arm, a spring interconnecting the claw and slidable latch member and yieldably biasing the claw into said outstretched position, said second limit stop being engaged by and interlocked with the latching element when the claw is rotated through a predetermined arc to an angular position with respect to the arm, whereby, as the claw is advanced into a carcass, contact therebetween rotates the arm from its outstretched to angular position.

5. An eviscerating machine comprising a stage for supporting a carcass, an arm, mechanism for moving the arm linearly with respect to the stage, a pivotal connection between the arm and mechanism whereby the arm may have arcuate movement, means engaging the arm to counterbalance its weight and sustain the arm in a generally horizontal direction, said arm having an end adjacent the stage, a slide disposed within the arm, a first spring within the arm urging the slide to the stage end thereof, a latch on the stage end of the slide, a claw pivotally mounted to the stage end of the arm, limit stops on the claw to limit the rotative movement thereof between a first position in which the claw is outstretched with respect to the arm and a second position in which the claw is angularly disposed, said latch engaging one of said stops when the claw is in either limit position, said latch and stop, when the claw is angularly disposed, interlocking with each other to retain the claw in such position, a second spring interconnected between the claw and the slide and yieldably biasing the claw to its outstretched position, and a lever mounted on the arm and having a loose connection with the slide and latch and operative to withdraw the slide away from the claw, whereby said interlocking engagement may be broken, and the second spring may restore the claw to its outstretched position.

References Cited in the file of this patent

UNITED STATES PATENTS

| Re. 21,983 | Brodeur | Dec. 23, 1941 |
| 1,798,585 | Bookheim | Mar. 31, 1931 |
| 1,986,195 | Griffin | Jan. 1, 1935 |
| 2,547,608 | Toti et al. | Apr. 3, 1951 |